US006660527B2

(12) United States Patent
Stroup

(10) Patent No.: US 6,660,527 B2
(45) Date of Patent: Dec. 9, 2003

(54) FLUID-TRANSFER COLLECTION ASSEMBLY AND METHOD OF USING THE SAME

(76) Inventor: David Karl Stroup, 1944 Altozano Dr., El Cajon, CA (US) 92020

(*) Notice: Subject to any disclaimer, the term of this patent is extended or adjusted under 35 U.S.C. 154(b) by 0 days.

(21) Appl. No.: 10/113,456

(22) Filed: Mar. 28, 2002

(65) Prior Publication Data

US 2003/0186456 A1 Oct. 2, 2003

(51) Int. Cl.[7] .............................................. G01N 21/03

(52) U.S. Cl. ....................... 436/165; 436/166; 436/180; 422/61; 422/58; 422/68.1; 422/81; 422/99; 422/100; 422/103; 422/104; 600/577; 600/576; 600/578; 600/579

(58) Field of Search ............................. 422/55, 56, 58, 422/61, 68.1, 69, 81, 99, 100, 101, 102, 103; 436/165, 166, 169, 174, 180, 164; 600/577, 576, 578, 579

(56) References Cited

U.S. PATENT DOCUMENTS

| | | | | |
|---|---|---|---|---|
| 3,640,388 A | | 2/1972 | Ferrari | 210/94 |
| 4,014,328 A | | 3/1977 | Cluff et al. | 128/214 |
| 4,685,472 A | | 8/1987 | Muto | 128/760 |
| 5,029,583 A | | 7/1991 | Meserol et al. | 128/633 |
| 5,096,669 A | * | 3/1992 | Lauks et al. | 204/403.02 |
| 5,505,212 A | | 4/1996 | Keljmann et al. | 128/771 |
| 5,595,187 A | | 1/1997 | Davis | 128/771 |
| 5,636,640 A | * | 6/1997 | Staehlin | 600/577 |
| 5,800,779 A | | 9/1998 | Johnson | 422/58 |
| 6,258,045 B1 | | 7/2001 | Ray et al. | 600/573 |
| 6,426,213 B1 | | 7/2002 | Eisenson | 435/288.7 |
| 2001/0007926 A1 | | 7/2001 | Trudil | 600/573 |
| 2001/0008614 A1 | | 7/2001 | Aronowitz | 422/101 |

* cited by examiner

*Primary Examiner*—Jill Warden
*Assistant Examiner*—Sam P. Siefke
(74) *Attorney, Agent, or Firm*—Procopio, Cory, Hargreaves & Savitch, LLP

(57) ABSTRACT

A fluid transfer and mixing collection assembly includes a base and a test media, an inlet check valve, and an outlet check valve carried by the base. A bladder containing a fluid and a flexible member are carried by the base between the check valves and are separated by a membrane. The flexible member is depressable to cause a pointed member extending from the flexible member to rupture the membrane, releasable to draw a sample fluid into an interior of the flexible member through the inlet check valve to mix with the fluid from the bladder, and depressable again to pump the mixed fluids out of the interior of the flexible member through the outlet check valve and be transferred to the test media.

4 Claims, 2 Drawing Sheets

FLUID-TRANSFER COLLECTION ASSEMBLY AND METHOD OF USING THE SAME

FIELD OF THE INVENTION

The present invention is, in general, in the field of fluid-transfer collection assemblies, and, in particular, in the field of fluid transfer and mixing collection assemblies.

BACKGROUND OF THE INVENTION

Collection kits used for testing one or more analytes of a sample include multiple separate components such as a pipettes, collection tubes, vials or ampoules containing needed diluents or reagents, and test media devices. Because these collection kits have so many separate pieces, in most cases, use of such collection kits has been limited to a laboratory. Simple tests may be performed outside of the laboratory using only test media devices, but these test media devices are limited as to the types of tests that can be performed. More elaborate tests require diluents, pipettes, collection tubes, etc., and are difficult and awkward to perform outside of the laboratory.

Accordingly, a need exists for a simple fluid transfer and mixing collection assembly that does not include numerous separate pieces, is easy to use, can be used for multiple different types of tests and can be used in and outside a laboratory.

SUMMARY OF THE INVENTION

Accordingly, an aspect of the invention involves a fluid transfer and mixing collection assembly. The collection assembly includes a base, a test media carried by the base, an inlet for receiving a first fluid, the inlet including an inlet check valve, an outlet including an outlet check valve, a bladder carried by the base between the inlet and the outlet and including an interior with a second fluid therein, and a depressable, flexible member carried by the base between the inlet and the outlet and including an interior. A membrane separates the interior of the bladder from the interior of the flexible member. The flexible member includes an exterior surface, an interior surface, and a pointed member extending from the interior surface of the flexible member. The flexible member is depressable to cause the pointed member to rupture the membrane, releasable to draw the first fluid into the interior of the flexible member through the inlet check valve to mix with the second fluid, and depressable again to pump the mixed first and second fluids out of the interior of the flexible member through the outlet check valve and be transferred to the test media.

Another aspect of the invention involves a method of using a fluid transfer and mixing collection assembly. The method includes providing a fluid transfer and mixing collection assembly including a base, a test media carried by the base, an inlet for receiving a first fluid, the inlet including an inlet check valve, an outlet including an outlet check valve, a bladder carried by the base between the inlet and the outlet and including an interior with a second fluid therein, and a depressable, flexible member carried by the base between the inlet and the outlet, the flexible member including an interior, a membrane separating the interior of the bladder from the interior of the flexible member, the flexible member including an exterior surface, an interior surface, and a pointed member extending from the interior surface of the flexible member; depressing the flexible member to cause the pointed member to rupture the membrane; releasing the flexible member to draw the first fluid into the interior of the flexible member through the inlet check valve to mix with the second fluid; and depressing the flexible member to pump the mixed first fluid and second fluid out of the interior of the flexible member through the outlet check valve and be transferred to the test media.

A further aspect of the invention involves a fluid-transfer collection assembly. The collection assembly includes an inlet for receiving one or more fluids, the inlet including an inlet check valve, an outlet including an outlet check valve, a test media, and a depressable, flexible member located between the inlet and the outlet and including an interior. The flexible member is depressable to cause one or more fluids to exit the interior of the flexible member through the outlet check valve and be transferred to the test media and releasable to draw one or more fluids into the interior of the flexible member through the inlet check valve.

A still further aspect of the invention involves a method of using a fluid-transfer collection assembly. The method includes providing a fluid-transfer collection assembly including an inlet for receiving one or more fluids, the inlet including an inlet check valve, an outlet including an outlet check valve, a test media, and a depressable, flexible member located between the inlet and the outlet and including an interior; depressing and releasing the bulb pump to draw one or more fluids into the interior of the bulb pump through the inlet check valve; and depressing the bulb pump again to cause the one or more fluids in the interior of the bulb pump to exit the interior of the bulb pump through the outlet check valve and be transferred to the test media.

Further objects and advantages will be apparent to those skilled in the art after a review of the drawings and the detailed description of the preferred embodiments set forth below.

DETAILED DESCRIPTION OF PREFERRED EMBODIMENTS

Figure 1:
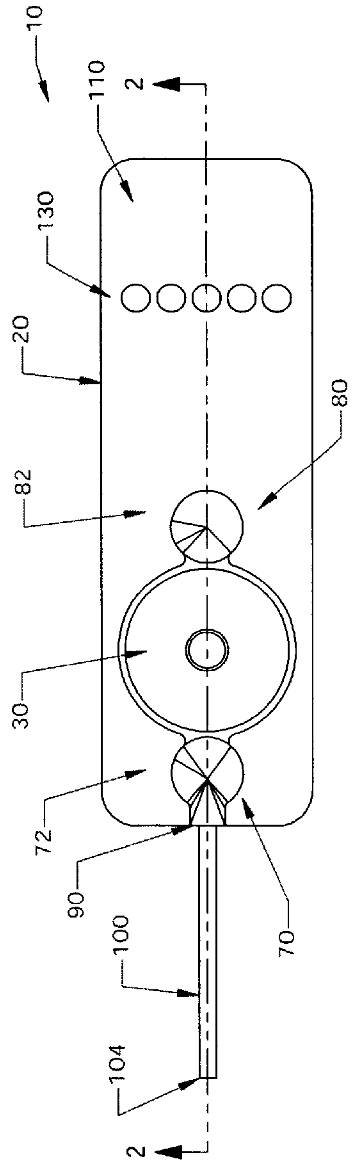
FIG. 1 is a top plan view of a fluid transfer and mixing collection assembly constructed in accordance with an embodiment of the invention.

With reference to FIGS. 1–4, an embodiment of a fluid transfer and mixing collection assembly 10, and method of using the same will now be described. Further below, the collection assembly 10 will be described as an optical assay test device in an optical assay test method; however, the collection assembly 10 may be used in other devices, processes, and applications where mixing of two or more fluids and/or delivery of one or more fluids to a collection area is desired.

The collection assembly 10 includes a substantially flat, rectangular, plastic base that carries a bulb pump 30 and a reagent bladder 40 separated by a pierceable membrane 50.

The bulb pump 30 may be a flexible, depressable, domed, elastic member having an exterior surface 52 and an interior surface 54. A spike 60 extends downward from the interior surface 54 towards the pierceable membrane 50. The spike 60 may be formed along with the bulb pump 30 or may be a separate element that is fixed to the interior surface 54 of the bulb pump 30 (e.g., a stylet or other pointed member). Although the bulb pump 30 is shown as being located on an upper surface of the base 20 and oriented in an upward direction, in alternative embodiments, the bulb pump 30 may be located at other locations on the base 20 and may be oriented in one or more of an upward, a downward, a lateral, a forward, and a rearward direction with respect to the base 20. Similarly, the bladder 40 may be located at other locations on the base 20 and oriented differently.

The pierceable membrane 50 is a thin, rupturable membrane and includes an upper surface 62 exposed to an interior 64 of the bulb pump 30 and a lower surface 66 exposed to an interior 68 of the bladder 40.

Figure 2:
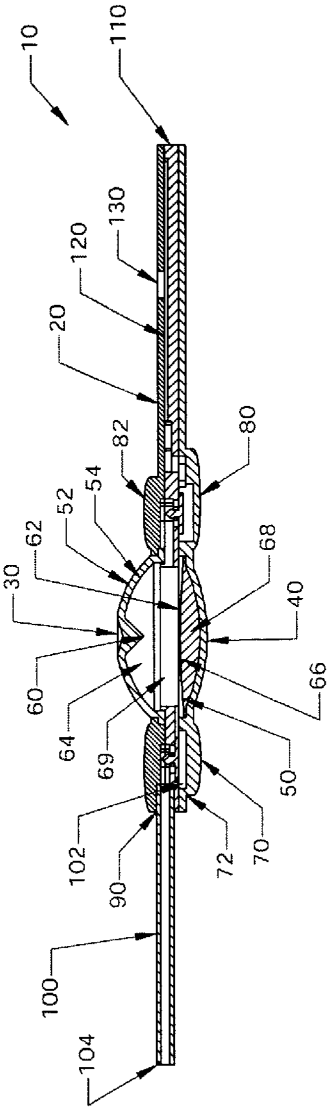
FIG. 2 is a cross-sectional view of the fluid transfer and mixing collection assembly of FIG. 1 taken along line 2—2 of FIG. 1.

In the embodiment shown in the FIG. 2, the fluid in the interior 64 of the bulb pump 30 is air and the fluid in the interior 68 of the bladder 40 is one or more chemical reagents or diluents. In alternative embodiments, one or more different types of fluids may be used in the bulb pump 30 and the bladder 40.

A fluid path 69 is located directly above the upper surface 62 of the pierceable membrane 50 between an inlet check valve 70 of an inlet 72 and an outlet check valve 80 of an outlet 82. The inlet 72 may include an inlet port 90 that communicates with a sample tube 100. The sample tube 100 may include a proximal end 102 and a distal end 104. The outlet check valve 80 communicates with a test media 110 via one or more fluid paths 120.

The test media 110 may include visual indicia 130 to visually indicate the presence or absence of a target analyte or other target object(s). The test media 110 may include one or more of the following: base strip(s), sample pad(s), conjugate pad(s), membrane(s), and absorbent pad(s).

With reference additionally to FIGS. 4A–4D, the collection assembly 10 will now be described in use as an optical assay test device in an exemplary optical assay method of use. The collection assembly 10 and method of use may be used in applications such as, but not by way of limitation, drug screening, chemical analysis, crime/accident scene investigations, ground water testing (EPA), and livestock testing.

Figure 4D:
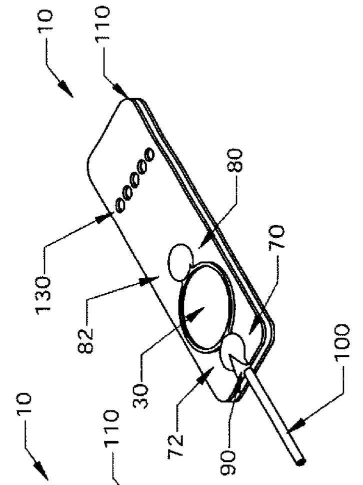
FIGS. 4A–4D illustrate an exemplary method of using the fluid transfer and mixing collection assembly of FIG. 1.
Figure 4C:
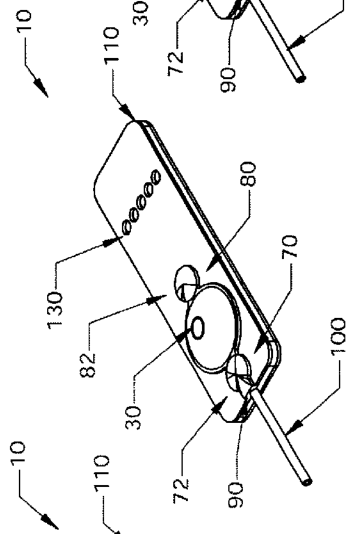
Figure 4B:
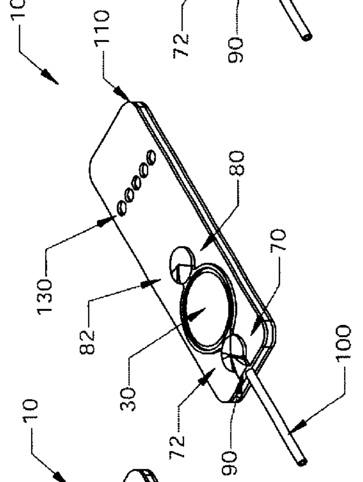
Figure 4A:
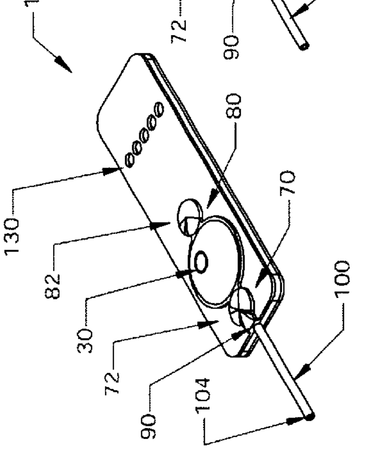

With reference to FIGS. 2 and 4A, the distal end 104 of the sample tube 100 may be put in communication with a fluid sample. The sample may be any fluid medium such as, but not by way of limitation, a gas, a liquid, a suspension, an extracted or dissolved sample, or a supercritical fluid, as long as some flow properties exist in the sample. The sample may include one or more target analytes of interest for detection. Example analytes include, but not by way of limitation, antigens, antibodies, receptors, ligands, chelates, proteins, enzymes, nucleic acids, DNA, RNA, pesticides, herbicides, inorganic or organic compounds or any material for which a specific binding reagent may be found.

Figure 3:
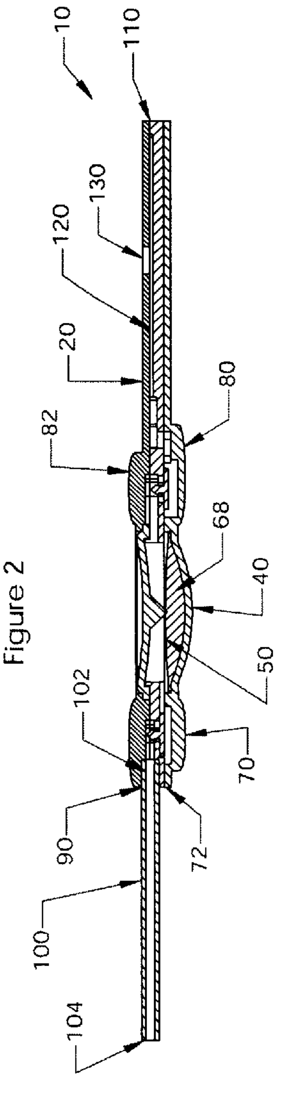
FIG. 3 is a cross-sectional view, similar to FIG. 2, of the fluid transfer and mixing collection assembly of FIG. 1 and illustrates a flexible member of the assembly in a depressed condition and a bladder of the assembly in a ruptured condition.

With reference to FIGS. 3 and 4B, the bulb 30 is depressed, causing the spike 60 to pierce the membrane 50 of the reagent bladder 40 and the bladder 40 to rupture.

With reference to FIG. 3C, release of the bulb 30 creates a vacuum force in the bulb 30, causing the sample to flow from the sample reservoir, through the tube 100 and the inlet check valve 70, into the interior 64 of the bulb 30, where the sample mixes and reacts with the reagent.

With reference to FIG. 4D, the bulb 30 is depressed again, causing the resulting reaction fluid to flow via the fluid path 69 out of the bulb 30 and bladder 40, through the outlet check valve 80 and the one or more fluid paths 120, and to the test media 110. The visual indicia 130 of the test media 110 may indicate the presence or absence of a target analyte for the optical assay method.

Although the collection assembly 10 has been described as including a bladder 40 that may be ruptured to mix a fluid in the bladder 40 with a sample fluid, in an alternative embodiment, the collection assembly 10 may not include the bladder 40, the pierceable membrane 50, and spike 60. In such an embodiment, the bulb pump 30 may be depressed and released, causing the sample fluid to be drawn through the sample tube 100 and the inlet check valve 70, into the interior 64 of the bulb pump 30. Depressing the bulb pump 30 again causes the sample fluid to exit the interior 64 of the bulb pump 30 via the outlet check valve 80 and be transferred through the one or more fluid paths 120 to the test media 110. Thus, in this embodiment, the assembly 10 functions as a fluid-transfer collection assembly instead of a fluid transfer and mixing collection assembly.

Numerous features, implementations, and embodiments of the collection assembly 10 will now be described. The collection assembly 10 may be used more than once to perform the same test, different tests, or may be disposed of after single use. Different collection assemblies 10 may be used to perform different tests. The collection assembly 10 may be used to test for one or more analytes. The collection assembly 10 may be held and operated with a single hand of a user. In the embodiment of the collection assembly 10 shown in FIGS. 1–3, the user may operate the bulb pump 30 with a thumb or other digit of the same hand used to hold the collection assembly 10. In an alternative embodiment, the collection assembly 10 may have more than one member (e.g., bulb pump 30) that is actuatable using any of the digits of the hand used to hold the collection assembly. For example, a first bulb pump 30/bladder 40 combination may be used to transfer a sample fluid into the first bulb pump, mix the sample fluid with a first reagent/diluent, and transfer the combined sample fluid and first reagent/diluent out of the first bulb pump. A second bulb pump 30/bladder 40 combination may be used to transfer the combined sample fluid and first reagent/diluent into the second bulb pump, mix this with a second reagent/diluent, and transfer this mixture to a test media for testing. The collection assembly 10 is especially advantageous in that the multiple transfer and mixing steps can all be done with a single hand of the user.

Although the embodiment of the collection assembly 10 shown in FIGS. 1–3 includes a single bladder 40, in an alternative embodiment, the collection assembly 10 may have multiple bladders 40, one or more of which includes a rupturable membrane 50. The bladders 40 may contain the same or different reagent(s)/diluent(s). Further, the collection assembly 10 may have one or more bladders 40 containing one or more reagent(s)/diluent(s) and/or one or more separate reagent(s)/diluent(s) may be used with collection assembly 10 during the test process. In a still further embodiment of the collection assembly 10, the collection assembly 10 may not have any bladder 40. In such an embodiment, separate diluent(s)/reagent(s) may be used with collection assembly 10 during the test process or no diluent(s)/reagent(s) may be used with collection assembly 10 during the test process, e.g., the sample fluid may be the only fluid transferred and collected by the assembly 10.

In one or more embodiments of the collection assembly 10, the sample tube 100 may have one or more of the following: the sample tube 100 may be fixed to the inlet 72, the sample tube 100 may be retractable, the sample tube 100 may not be retractable, the sample tube 100 may lock to the inlet 72, the sample tube 100 may not lock 72 to the inlet 72, the sample tube 100 may detachably connect to the inlet 72, the sample tube may include or be replaced with one or more wicks, sponges, open-cell foams, porous materials, or other absorbent materials.

In a further embodiment, the collection assembly 10 may include one or both of the inlet check valve 70 and the outlet check valve 80. Further, one or both of the inlet check valve 70 and the outlet check valve 80 may be replaced with one or more different types of valves. Still further, the collection assembly 10 may have a number of valves other than that shown in FIGS. 1–3, the number of valves depending on the number of bulb pumps 30.

The assembly 10 is advantageous in that it can be gripped in one hand and by the simple action of pressing and releasing the bulb pump 30 with a digit of the same hand, fluid can be drawn into the bulb pump 30 through the check valve 70. If the assembly 10 includes a rupturable bladder 40 with a different fluid and the bulb pump 30 includes a spike, pressing and releasing the bulb pump 30 can cause the bladder to rupture and the fluids to mix in the bulb pump 30. Pressing the bulb pump 30 again pumps the fluid out of the bulb pump 30 through the outlet check valve 80. In an exemplary embodiment of the assembly 10, the fluid pumped out of the bulb pump 30 can be collected on a test media to test the fluid for the presence or absence of a target object in the fluid. Because the unit is so simple to use, the assembly 10 may be used by the user for testing in the field, in the lab, and in the home for a wide variety of applications.

It will be readily apparent to those skilled in the art that still further changes and modifications in the actual concepts described herein can readily be made without departing from the spirit and scope of the invention as defined by the following claims.

What is claimed is:

1. A method of using a fluid transfer and mixing collection assembly, comprising:

providing a fluid transfer and mixing collection assembly including a base, a test media carried by the base, an inlet for receiving a first fluid, the inlet including an inlet check valve, an outlet including an outlet check valve, a bladder carried by the base between the inlet and the outlet and including an interior with a second fluid therein, and a depressable, flexible member carried by the base between the inlet and the outlet, the flexible member including an interior, a membrane separating the interior of the bladder from the interior of the flexible member, the flexible member including an exterior surface, an interior surface, and a pointed member extending from the interior surface of the flexible member;

depressing the flexible member to cause the pointed member to rupture the membrane;

releasing the flexible member to impart a negative pressure in the interior of the flexible member to draw the first fluid into the interior of the flexible member through the inlet check valve to mix with the second fluid;

depressing the flexible member to impart a positive pressure in the interior of the flexible member to pump the mixed first fluid and second fluid out of the interior of the flexible member through the outlet check valve and be transferred to the test media.

2. The method of claim 1, wherein the fluid transfer and mixing collection assembly further includes a sample tube having a proximal end connected to the inlet and a distal end, and the method further includes communicating the distal end of the sample tube with the first fluid to draw the first fluid into the interior of the flexible member.

3. The method of claim 1, wherein the inlet check valve only allows fluid into the flexible member and the outlet check valve only allows fluid out of the flexible member.

4. The method of claim 1, wherein the method is an assay test method, the first fluid is a sample fluid including an analyte of interest for assay testing, the second fluid is a reagent, and the test media visually indicates the presence or absence of an analyte of interest.

* * * * *